B. G. FRY.
FLOAT.
APPLICATION FILED JAN. 19, 1916.

1,198,339.

Patented Sept. 12, 1916.

WITNESSES:
E. W. Callaghan
C. E. Trainer

INVENTOR
BYRON G. FRY,
BY Munn & Co.
ATTORNEYS

UNITED STATES PATENT OFFICE.

BYRON G. FRY, OF RIDGEFIELD, WASHINGTON, ASSIGNOR OF ONE-HALF TO FRANK B. THORN, OF PORTLAND, OREGON.

FLOAT.

1,198,339.  Specification of Letters Patent.  Patented Sept. 12, 1916.

Application filed January 19, 1916. Serial No. 73,025.

*To all whom it may concern:*

Be it known that I, BYRON G. FRY, a citizen of the United States, and a resident of Ridgefield, in the county of Clarke and State of Washington, have invented a new and useful Improvement in Floats, of which the following is a specification.

My invention is an improvement in floats, and the invention has for its object to provide a device of the character specified, adapted for use with nets, seines, traps, and the like for buoying lines, wherein an approximately cylindrical hollow body is provided having heads at its ends, and having means in connection with the heads for permitting the heads to be attached or disconnected from a line at any point of its length without the necessity for stringing the line through eyes on the float or the like, and wherein while the attachment is easily connected or detached by authorized persons it cannot become accidentally disengaged.

Figure 1:
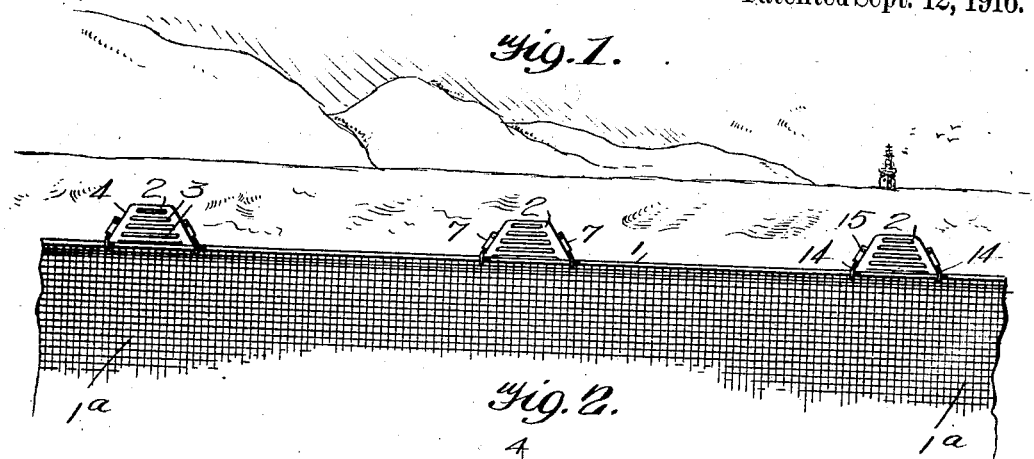
Figure 2:
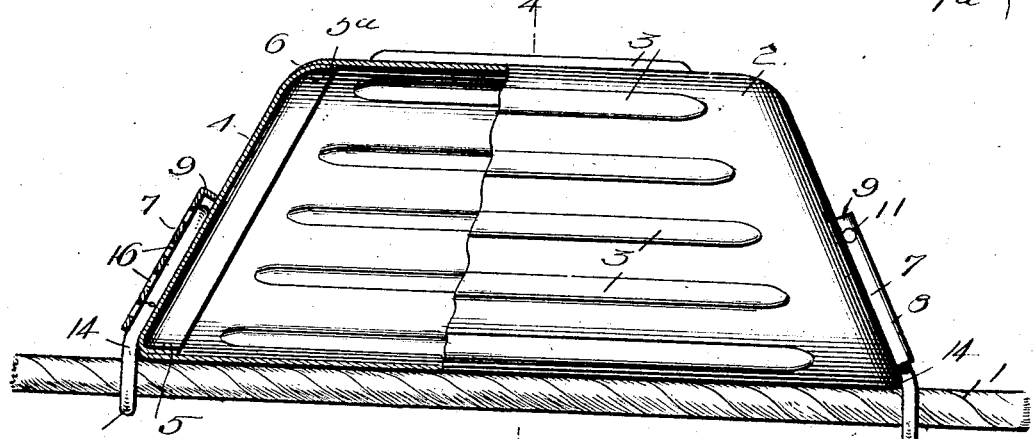
Figure 3:
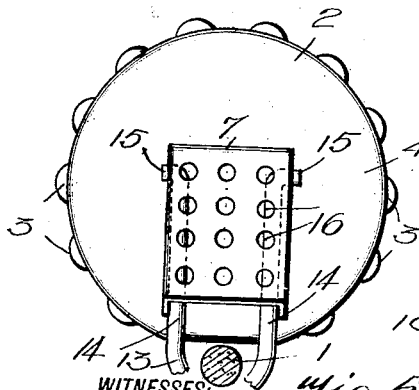
Figure 5:
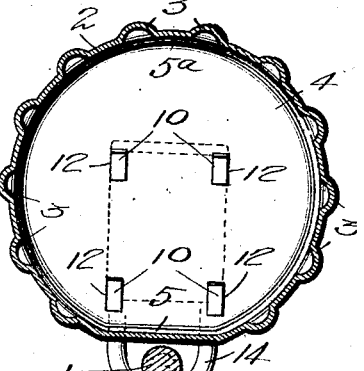
Figure 4:
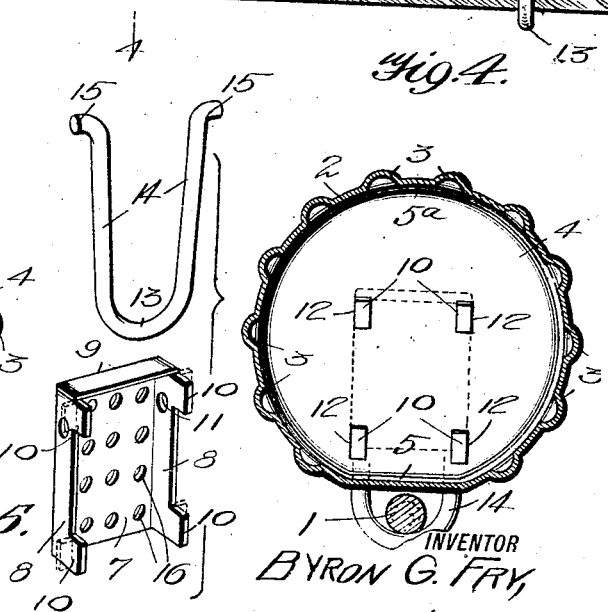

In the drawings:—Figure 1 is a partial side view of a net provided with the improved floats, Fig. 2 is an enlarged side view of a float with parts in section, Fig. 3 is an end view of the float, Fig. 4 is a section on the line 4—4 of Fig. 2, and Fig. 5 is a perspective view of one of the connecting devices detached and disconnected.

The present embodiment of the invention is shown in connection with one of the lines 1, forming a portion of a net 1ª, and the floats are arranged at suitable intervals on the lines for buoying the line as shown in Fig 1.

Each of the floats consists of a substantially cylindrical body portion 2 of suitable metal, as for instance sheet iron, copper or the like, and it will be noticed that the body is provided with spaced parallel longitudinally extending corrugations or grooves on its inner face, the said grooves or corrugations forming ribs 3 on the outer face of the body. The ends of the body are beveled as shown more particularly in Fig. 2 and in opposite directions, and each end is closed by a head 4. Each of the heads is of elliptical form to fit within the adjacent end of the body and each head has a lateral flange 5—5ª fitting within the end of the body. It will be noticed that at the short side of the body, namely, at the side remote from the line, when the float is in the water and buoyed by the water the portions 5ª of the flanges are obtuse to the planes of the heads, while at the long side of the body, that is, at the side adjacent to the line the portions 5 of the flanges are at an acute angle with respect to the plane of the heads. In other words the flange 5—5ª of each head is so shaped that it will fit within the ends of the body and the ends of the body are drawn or bent inwardly as shown at 6 to fit outside of the flange 5—5ª of each end closely to prevent disengagement thereof. Each head is preferably stamped into form from a single piece of metal, and it will be obvious that they might be secured within the ends of the body in any suitable or desired manner.

Mechanism is provided for connecting the float to the line, the said mechanism being connected with the heads. Each of the said mechanisms comprises a plate 7, having at its opposite side edges similar flanges 8 and having at one end a flange 9 extending in the same direction as the flanges 8. Each of the flanges 8 is provided at its ends with tongues or tabs 10, and each flange 8 is also provided with a transverse opening 11 near the tongue at one end. These tongues or tabs 10 are adapted to pass through slits or slots 12 in the heads from without inwardly, and the tongues or tabs are then bent laterally inwardly as shown in Figs. 4 and 5 to prevent disengagement of the plate from the head. With this arrangement the plate forms a species of casing open at one end and at the end adjacent to the flange portion 5 of the head.

A staple comprising a body 13 and arms 14 is provided for coöperating with each plate or casing 7—8—9. These staples are adapted to engage the line 1, the arms 14 of the staple resting astride of the line and there is sufficient resiliency in the body to normally hold the arms in the position of Fig. 5. The staple is in its normal condition V-shaped rather than U-shaped, the arms 14 diverging from the body instead of being parallel. The said arms engage within the casing 7 as shown in Fig. 3, and the free end of each arm is provided with a lateral outwardly extending lug 15 for engaging the adjacent opening 11 of the adjacent flange 8. The arrangement is such that when the lugs 15 are engaged with the openings 11 the arms will engage the flanges 8 of the plates 7 from the upper edge or end of the flange to the opening 11. To disengage a staple from the plate it is only necessary to compress the arms, that is, to draw them together to disengage the lugs 15 from the openings 11 after which the staple may be withdrawn from the casing 7. It will be noted from an inspection of Fig. 2 that the arms of each staple are bent adjacent to the body at an obtuse angle, so that when the float is in place on the line as shown in Fig. 2, a plane through the body and the adjacent portions of the arms of each staple will be perpendicular to the line.

In practice the floats are engaged with the line by removing the staples, seating the staples astride the line as shown and again engaging the lugs 15 with the openings 11. The arms 14 are compressed to permit the lugs 15 to enter the casing, after which by pushing the staple toward the flange 9 the lugs 15 will engage with the openings 11, and when the said lugs snap into place the end of the float is connected to the line.

As shown in Figs. 2, 3 and 4 the bodies 7 of the casings 7—8—9 are preferably provided with openings or perforations 16 to lighten the float as a whole. It will be obvious that as many or as few floats may be used as may be necessary to properly buoy the line. The floats are made from non-rusting material, and they may be painted or plated if desired.

It is obvious that the heads may be secured in place by brazing or soldering if thought necessary, and whenever, for any reason, it is necessary to detach the float it is only necessary to compress the arms of the staple and withdraw them from the casing. When the floats are not in use the staples are snapped into place in the casings and all of the parts are together.

When not in use the floats may be strung on a holding line. As is known, it is quite a difficult operation to string floats on a line for in addition to the difficulties there is always the liability that the line will be tangled and will become tangled with the net.

The heads are of the same material as the bodies of the float, and the staples 13—14 are of spring material, as for instance, spring wire.

It will be obvious that when the net is in the water the floats will be above the line as shown in Figs. 1 and 2. When the net is out of the water the floats will be below the line because of the effect of gravity.

I claim:—

1. A float comprising a hollow body having its ends beveled in opposite directions, and a head closing each end, each head having a casing on its outer face, each casing being formed from a plate having laterally extending side flanges and a flange at one end, said flanges engaging the outer face of the head and being secured thereto, the side flanges having registering openings near the end flange, and a staple comprising a body and arms resting astride the line and adapted to enter the casing at the open end thereof, said arms having outwardly extending lugs at their free ends for engaging the openings of the flanges of the casing.

2. A float comprising a hollow body having its ends beveled in opposite directions, and a head closing each end, each head having a casing on its outer face and having an open end adjacent to the long side of the float, and a U-shaped clamping staple adapted to engage astride a line, and to enter the open end of a casing, each staple having outwardly extending lugs at the free ends of its arms, and the side walls of the casing having openings for engaging the lugs.

3. A float comprising a hollow body having its ends beveled in opposite directions, and a head closing each end, each head having a staple for engaging a line, and means on each side for engagement by the staple to detachably connect the head with the line.

4. A float comprising a hollow body having each end provided on its outer face with a casing having one of its ends open and the openings of the casings being at the same side of the body, and a U-shaped clamping staple for each casing and adapted to engage astride the line and to enter the open end of the casing, each staple having outwardly extending lugs at the free ends of these arms, and the side walls of the casings having openings for engaging the lugs.

5. A float comprising a hollow body having means for detachably connecting the float with the line, said means comprising a substantially U-shaped casing consisting of a body and laterally extending flanges connected with the float to hold the body in spaced relation with respect to the float, said flanges having openings and a staple comprising a body and arms, the arms being adapted to engage between the casing and the float, and having outwardly extending lugs for engaging the openings.

BYRON G. FRY.